Dec. 25, 1962   C. VAN DER LELY ETAL   3,070,376
IMPLEMENT FOR SPREADING POWDERED OR GRANULAR MATERIAL
Filed April 19, 1960

United States Patent Office 3,070,376
Patented Dec. 25, 1962

3,070,376
IMPLEMENT FOR SPREADING POWDERED OR GRANULAR MATERIAL
Cornelis van der Lely, Zug, Switzerland, and Ary van der Lely, Maasland, Netherlands, assignors to C. van der Lely N.V., Maasland, Netherlands, a company of the Netherlands
Filed Apr. 19, 1960, Ser. No. 23,202
Claims priority, application Netherlands May 16, 1959
3 Claims. (Cl. 275—14)

This invention relates to implements for spreading powdered or granular material of the kind including a frame having a container for the material to be spread and an ejector adapted to spread the material so that it leaves the ejector in substantially horizontal directions and falls to the ground at least rearwardly or laterally of the implement.

Known implements of this kind suffer from the disadvantage that, under adverse wind conditions or when certain types of material are being spread, the material blows away in dust clouds or is very unevenly distributed over the ground. Previous attempts to avoid this disadvantage have resulted in constructions in which the area of distribution of the material has become unduly restricted, thus increasing the work necessary to cover a given area of land or the like.

It is an object of the invention to overcome, or at least reduce, the above disadvantage without unduly restricting the area of distribution of the material by the implement.

In accordance with the invention there is provided an implement of the kind set forth wherein a baffle is arranged above the ejector and covers the same, at least in regions thereof where material will leave the ejector when the same is in operation, and wherein the baffle extends beyond the ejector at least in said regions, the baffle being so shaped that a downward component of movement is imparted to material which strikes the baffle after leaving the ejector, and the arrangement being such that when the ejector is in operation, none of the material which leaves the ejector and which will come to rest upon the desired area to be spread, encounters a vertical, or substantially vertical, surface forming part of the baffle, whereby the baffle does not restrict the distribution of the material to an area substantially equal to that of the baffle in the said regions where the baffle extends beyond the ejector.

Figure 1:
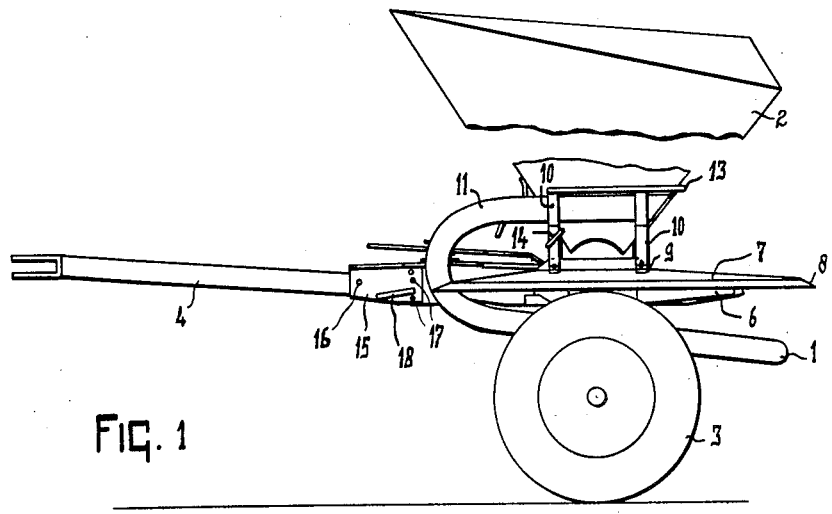
Figure 2:
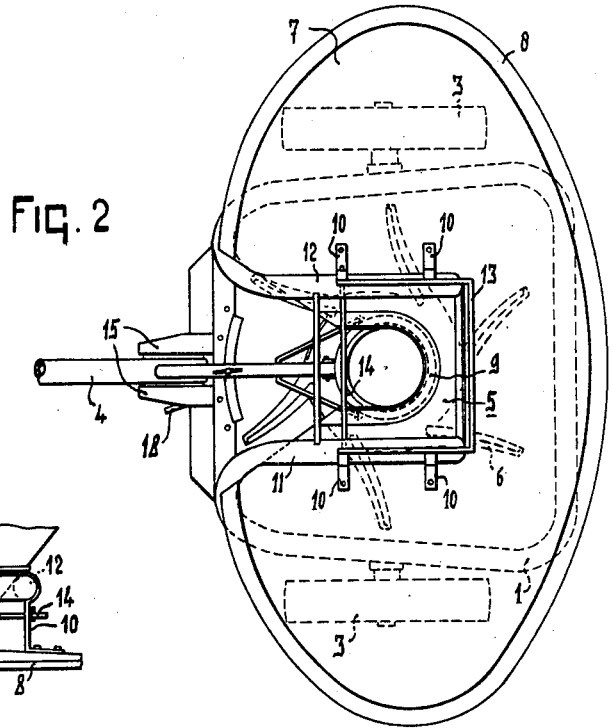
Figure 3:
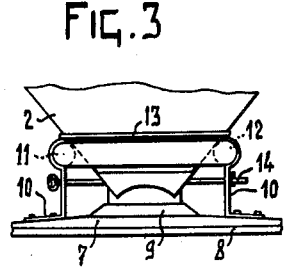

For a better understanding of the invention and to show how the same may be carried into effect, reference will now be made to the accompanying drawings, in which:

FIGURE 1 is a side elevation of a spreading implement in accordance with the invention, FIGURE 2 is a plan view corresponding to FIGURE 1 but with an upper part of the implement removed, and FIGURE 3 is a rear elevation of part of the implement shown in FIGURE 1.

Referring to the drawings, the implement comprises a frame 1 supported by a pair of ground-engaging wheels 3, and has a draw-bar 4 projecting forwardly of the implement in its intended direction of travel. The free end of the draw-bar 4 is provided with a fork by the aid of which it can be attached to a tractor or other draft means. Two cheeks 15 are attached to the frame 1 and project forwardly of the implement. The draw-bar 4 is pivoted to a pin 16 extending horizontally between the cheeks 15 and can be turned about the pin 16 into positions in which a transverse horizontal bore (not shown) is in alignment with one of a number of pairs of holes 17 provided in the opposite cheeks 15. A locking pin 18 can then be inserted through the selected pair of holes 17 and the aligned bore to set the inclination of the frame 1 to the ground.

The frame 1 includes two substantially horizontal parallel frame beams 11 and 12, which extend in the intended direction of travel, and between which a container 2 is secured. The container 2 is generally conical in shape and is adapted to carry a supply of powdered or granular material such, for example, as artificial manure to be spread on the land by the implement.

An ejector 5 is mounted beneath the container 2 and is rotatable about a substantially vertical axis by means of a connection (not shown) with the ground-engaging wheels 3. The ejector 5 has a plurality of hollow arms 6 from which the powdered or granular material is ejected on to the land in substantially horizontal directions due to the centrifugal force generated by the rotation of the ejector 5 about its vertical axis. Control mechanism is provided by means of which an operator can adjust the volume of material flowing through the ejector 5 at any time and by means of which the direction in which the ejected material leaves the implement can be regulated. The operation of ejectors of this type are well known per se and, accordingly, no further description of the ejector 5 or of its control mechanism will be given in the present specification.

A baffle in the form of a plate 7 covers the ejector 5, and is arranged at a height of less than two inches, and preferably of about one inch, above the latter, the plate 7 being generally kidney-shaped (see FIGURE 2) and the lobes of the kidney extending on either side of the implement. The greater part of the area of the plate 7 is inclined downwardly from its centre to its outer edge at a very small angle to the horizontal (see FIGURE 1) whilst the marginal part of the plate is provided with a rim 8 which is inclined downwardly at a steeper angle of not more than 45°. The plate is also provided with a lip 9 by means of which it engages closely around the lower end of the container 2 in a manner tending to prevent the admission of any substantial quantity of air. The admission of air at this point would be likely to cause turbulence in the ejector 5 and would thus adversely affect the distribution of the material.

Four brackets 10 are attached to the upper surface of the plate 7, two of the brackes 10 being arranged on one side of the container 2 and the others being arranged on the opposite side. The brackets 10 are formed from flat strips and are bent in such a way that each bracket includes a semi-cylindrical portion adapted to engage slidably around one or other of the correspondingly shaped sides of the frame beams 11 and 12 (see particularly FIGURE 3). The upper extremities of the four brackets 10 are secured to one another by means of a connecting member 13 which has the configuration of three sides of a rectangle. A hole is provided in each of the two brackets 10 nearest the front of the implement and a retaining pin 14 can be passed through these two holes transversely of the implement to hold the plate 7 in a fixed position.

The implement operates in the following manner: Powdered or granular material may be spread by the ejector 5 without the plate 7 being in position but, in the case of some materials or under unfavourable wind conditions, the material blows away in the form of dust clouds or is spread very unevenly over the land. Under such conditions, the plate 7 may be placed in position on the implement, and this is achieved by sliding the semi-cylindrical portions of the brackets 10 along the frame beams 11 and 12 in a direction from right to left in FIGURES 1 and 2. When the plate 7 is in its correct position with the transverse part of the connecting member 13 substantially against the rear side of the container 2, the retaining pin 14 is inserted through the holes in the two front brackets 10 to maintain this position by contact of the pin 14 with the front side of the container 2.

When the implement is working with the plate 7 in position, any material which leaves the ejector arms 6 and which has an upward component of movement will strike either the slightly inclined area of the plate 7 or the more steeply inclined rim 8 and will thus be given a downward component of movement. It has also been found that the provision of the plate 7 tends to prevent a whirling motion of the air around the implement, with a consequent improvement in the evenness of spreading of the material. It should be noted particularly that, although the plate 7 and rim 8 impart a downward component of movement to any material which does not already have such a component, at no point does the plate 7 include a vertical, or substantially vertical, surface which might be encountered by the material, so that the plate does not restrict the distribution of the material to an area substantially equal to that of the plate itself. The plate extends laterally and rearwardly of the implement over a distance which is greater than the radius of the ejector 5 and the area of distribution of the material may be affected by tilting the general plane of the frame 1, and thus of the plate 7, about the axis of rotation of the ground-engaging wheels 3. This is achieved by withdrawing the locking pin 18 and selecting a pair of holes 17 which give the desired inclination. The locking pin 18 is then replaced.

In the embodiment described, the plate 7 has been mentioned as being generally kidney-shaped. However, baffles or plates of other shapes, such as circular, may be employed if desired. The use of a rotating ejector 5 has been described but the implement may be provided with ejectors of other kinds, such as rocking or reciprocating ejectors, if preferred.

What we claim is:

1. An implement for spreading granular or powdery material, comprising a frame, a container on said frame and adapted for accommodating the material, an ejector disc rotatably mounted on said frame in operative disposition with respect to said container to receive material therefrom and spread the same, and a screening plate fixedly coupled to the frame in adjustable manner, said plate including a central portion covering said ejector disc at least in regions thereof where material will leave the ejector disc when the same is in operation, said central portion of said plate extending beyond the ejector disc at least in said regions, said plate including marginal parts constituted by an inclined rim having a free end, said central portion of said plate radiating outwardly in downwardly fashion from a position above the ejector disc towards said marginal parts and making a relatively small angle with the horizontal, said rim extending radially outwardly in downwardly fashion at a greater angle than that of the central portion of said plate to define an angle with said central portion and an angle relative to the vertical, said rim being disposed in position such that, with the ejector disc in operation, at least part of the material leaving the ejector disc strikes the rim and is given an inclined movement to throw the material out along the rim in a downwardly inclined direction beyond the free end of said rim.

2. An implement as claimed in claim 1, comprising two substantially horizontal frame beams on said frame and wherein the plate includes a plurality of brackets supported on said frame beams, said frame beams extending in the normal direction of travel of the implement and being parallel to one another, said brackets being slidable along said beams, and retaining means for releasably maintaining said plate in a fixed position relative to the frame beams.

3. An implement as claimed in claim 1, comprising means whereby the horizontal position of the frame and thus the ejector and the inclination of said plate are adjustable relative to a horizontal plane in a direction parallel to a vertical plane extending in the direction of travel of the implement.

References Cited in the file of this patent

UNITED STATES PATENTS

| | | |
|---|---|---|
| 1,164,579 | Curtis | Dec. 14, 1915 |
| 2,586,492 | Ulrich | Feb. 19, 1952 |
| 2,672,347 | Rausch | Mar. 16, 1954 |
| 2,954,982 | Saiberlich | Oct. 4, 1960 |
| 2,958,531 | Stokland | Nov. 1, 1960 |

FOREIGN PATENTS

| | | |
|---|---|---|
| 518,225 | Belgium | Mar. 31, 1953 |
| 2,567 | Great Britain | of 1879 |